(12) United States Patent
Shibata

(10) Patent No.: US 9,338,342 B2
(45) Date of Patent: May 10, 2016

(54) INFRARED LENS UNIT AND INFRARED CAMERA SYSTEM PROVIDED WITH THE INFRARED LENS UNIT

(75) Inventor: Yukiko Shibata, Saitama (JP)

(73) Assignee: Tamron Co., Ltd., Saitama (JP)

( * ) Notice: Subject to any disclaimer, the term of this patent is extended or adjusted under 35 U.S.C. 154(b) by 828 days.

(21) Appl. No.: 13/401,000

(22) Filed: Feb. 21, 2012

(65) Prior Publication Data

US 2012/0212806 A1    Aug. 23, 2012

(30) Foreign Application Priority Data

Feb. 22, 2011  (JP) .................................. 2011-036433
Dec. 28, 2011  (JP) .................................. 2011-288257

(51) Int. Cl.
| G02B 13/14 | (2006.01) |
| H04N 5/232 | (2006.01) |
| G02B 7/10 | (2006.01) |
| G02B 27/64 | (2006.01) |
| H04N 5/33 | (2006.01) |

(52) U.S. Cl.
CPC ............ *H04N 5/23212* (2013.01); *G02B 7/102* (2013.01); *G02B 13/14* (2013.01); *G02B 27/646* (2013.01); *H04N 5/33* (2013.01)

(58) Field of Classification Search
CPC ........ G02B 7/003; G02B 7/005; G02B 7/008; G02B 7/023; G02B 7/028; G02B 7/04–7/105; G02B 13/008; G02B 13/14; G02B 13/146; G02B 27/646–27/648; G02B 7/28; G03B 3/00–3/02; G03B 3/10–3/12; G03B 13/32–13/36; G03B 2205/007–2205/0038; H04N 5/23212; H04N 5/2328; H04N 5/23287; H04N 5/33; H04N 5/3572

USPC .............................. 396/72, 79–82, 91, 93, 97
See application file for complete search history.

(56) References Cited

U.S. PATENT DOCUMENTS

| 4,929,834 | A | * | 5/1990 | Liebson ......................... 250/352 |
| 6,148,152 | A | * | 11/2000 | Cazier et al. ..................... 396/97 |
| 6,707,044 | B2 | * | 3/2004 | Lannestedt et al. ........... 250/351 |
| 7,110,667 | B2 | * | 9/2006 | Nakazawa ....................... 396/97 |
| 2002/0080242 | A1 | | 6/2002 | Takahashi et al. |
| 2002/0162963 | A1 | | 11/2002 | Lannestedt et al. |
| 2005/0012843 | A1 | | 1/2005 | Kuwakino et al. |
| 2005/0063694 | A1 | | 3/2005 | Nakazawa |
| 2005/0157180 | A1 | | 7/2005 | Takahashi et al. |
| 2007/0196100 | A1 | | 8/2007 | Miyake |
| 2009/0067040 | A1 | | 3/2009 | Izumi |
| 2011/0026908 | A1 | * | 2/2011 | Nishimura ....................... 396/55 |

FOREIGN PATENT DOCUMENTS

| CN | 101387738 A | 3/2009 |
| JP | S6247025 A | 2/1987 |
| JP | 09-053993 A | 2/1997 |
| JP | 2680879 B2 | 11/1997 |

(Continued)

*Primary Examiner* — Jennifer L Doak
*Assistant Examiner* — James McGee
(74) *Attorney, Agent, or Firm* — The Webb Law Firm

(57) ABSTRACT

An object of the present invention is to provide an infrared lens unit having a high optical quality and an infrared camera system provided with the infrared lens unit. An infrared lens unit according to the present invention to achieve the object is the infrared lens unit to be attached to an infrared camera-module characterized in comprising a data memory for storing lens data and an image focusing condition is controlled according to the data stored in the data memory and temperature data in the infrared lens unit.

13 Claims, 5 Drawing Sheets

(56) References Cited

FOREIGN PATENT DOCUMENTS

| JP | 2002-049069 A | 2/2002 |
| JP | 2002-158917 A | 5/2002 |
| JP | 2004362924 A | 12/2004 |
| JP | 2005-004181 A | 1/2005 |
| JP | 2005236550 A | 9/2005 |
| JP | 2005-352137 A | 12/2005 |
| JP | 2006352668 A | 12/2006 |
| JP | 2008-258991 A | 10/2008 |
| KR | 10-1076027 B1 | 10/2011 |

\* cited by examiner (A)

Heat-Shrinkable Tubing (B)

View on Arrow a

INFRARED LENS UNIT AND INFRARED CAMERA SYSTEM PROVIDED WITH THE INFRARED LENS UNIT

BACKGROUND OF THE INVENTION

1. Field of the Invention

The present invention relates to an infrared lens unit and an infrared camera system provided with the infrared lens unit.

2. Background Art

Infrared cameras have been required compensation of a photographed image because of infrared sensing errors due to variations in sensitivity of infrared detectors. Accordingly, in many of the infrared cameras, a shutter is shut to perform offset compensation, and then an offset data is obtained to update the sensitivity compensation data, as disclosed in Japanese Patent Laid-Open No. 2005-236550 "Infrared Camera". Then, the sensitivity compensation data previously obtained is stored in a memory in the infrared camera-module and photographed image is compensated according to the data.

However, the infrared camera disclosed in Japanese Patent Laid-Open No. 2005-236550 cannot achieve a sufficient compensation effect in image focusing in an environment where the heat radiated from the lens barrel or the optical system is different from the heat radiated at the time when the sensitivity compensation data is obtained even when image compensation is performed according to the sensitivity compensation data previously obtained. Incidentally, such environmental changes described above are caused by changes in sensitivity of infrared detectors by aging or factors such as stray light that occurs in the lens barrel. That is, on an infrared camera, such environmental changes may occur even a sensitivity compensation data is updated. As described above, it has been investigated how to make the environments when sensitivity compensation data is obtained and image focusing identical to each other to obtain an image excellent in definition.

The present invention has been investigated in view of the conventional problem and an object of the present invention is to provide an infrared camera system which can obtain an image excellent in definition without being affected by an environment in which the camera is used.

SUMMARY OF THE INVENTION

As a result of intensive studies, the inventors have adopted an infrared lens unit described below.

An infrared lens unit according to the present invention is the infrared lens unit to be attached to an infrared camera-module, the infrared lens unit comprising a data memory for storing a lens data, wherein an image focusing condition is controlled according to the lens data stored in the data memory.

The infrared lens unit according to the present invention preferably comprise a lens-side communication mechanism for sending a control signal on an image focusing condition in the infrared lens unit side.

The infrared lens unit according to the present invention preferably comprise a lens-side communication mechanism for sending a control signal for controlling an operation of the infrared camera-module to the infrared camera-module to control an image focusing operation of the infrared camera-module according to the lens data stored in the data memory.

In the infrared lens unit according to the present invention, the lens data is preferably a data on a transmission ratio.

In the infrared lens unit according to the present invention, the lens data is preferably a data on a heat radiated from a lens barrel and an optical system.

In the infrared lens unit according to the present invention, the lens data is preferably a data on a focal length.

The infrared lens unit according to the present invention preferably comprises a temperature detector detecting the temperature inside and/or on the surface of the lens barrel; and the lens-side communication mechanism sends detected temperature data to the infrared camera-module together with the lens data to control an image focusing operation of the infrared camera-module.

In the infrared lens unit according to the present invention, the temperature data is preferably one of a parameter of each function that compensate an effect of the transmission ratio of the lens, the heat radiated from a lens barrel and an optical system, and the focal length of the lens on an image photographed.

In the infrared lens unit according to the present invention, the temperature data is preferably a gap-compensation temperature data obtained by compensating a difference between the temperature inside and/or on the surface of the lens barrel detected by the temperature detector and the temperature of an imaging lens of the infrared lens unit at the time controlling an image focusing operation of the infrared camera-module.

The infrared lens unit according to the present invention preferably comprises a housing which makes containment of the infrared camera-module with the infrared lens unit enable; and a furnished housing detecting mechanism for detecting whether or not the infrared lens unit is furnished with the housing; wherein the gap-compensation temperature data is changed according to detection of the housing furnished.

In the infrared lens unit according to the present invention, the infrared camera-module is preferably provided with a heating mechanism and the gap-compensation temperature data is changed when the infrared camera-module is heated by the heating mechanism.

In the infrared lens unit according to the present invention, the lens data is preferably a data on the amount of image movement in a vibration compensation mechanism which optically compensates a fluctuation of a photographed image.

The infrared lens unit according to the present invention preferably comprise a housing which makes containing of the infrared camera-module and the infrared lens unit enable; and a furnished housing detecting mechanism for detecting whether or not the infrared lens unit is furnished with the housing; wherein the data on the amount of image movement in the vibration compensation mechanism is changed according to detection of the housing furnished.

The infrared lens unit according to the present invention is preferably an interchangeable type be attachable to and detachable from the infrared camera-module.

An infrared camera system according to the present invention is characterized in comprising the infrared lens unit.

An infrared camera system is made photographing of an image excellent in definition enable without being affected by an environment where the infrared camera is disposed when the infrared lens unit according to the present invention is used because the infrared lens unit itself stores lens data.

DETAILED DESCRIPTION OF THE PREFERRED EMBODIMENTS

Embodiments of infrared camera system according to the present invention will be described with reference to the drawings illustrating an embodiment.

Figure 1:
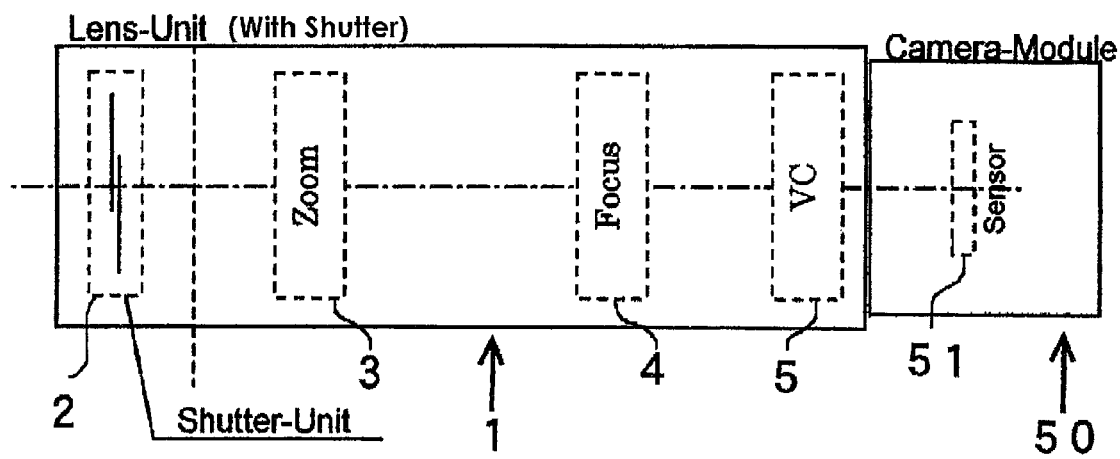
FIG. 1 is a schematic diagram illustrating a relationship between an infrared lens unit according to the present invention and an infrared camera-module.

Infrared lens unit according to the present invention: FIG. 1 is a schematic diagram illustrating a relationship between an infrared lens unit according to the present invention and an infrared camera-module. As illustrated in FIG. 1, the infrared lens unit 1 according to the present invention is used in the state attached to an infrared camera-module 50. The infrared lens unit 1 is characterized by provided with a data memory (not illustrated) which stores a lens data required to obtain a clear photographed image and image focusing condition is controlled according to the lens data stored in the data memory. That is, when the infrared lens unit 1 according to the present invention is used, because the infrared lens unit 1 has the function of storing lens data and the function of commanding and controlling conditions for driving of the infrared lens unit 1, more quick response to changes of the environment inside a lens barrel is enabled than a conventional infrared camera system that has these functions built in an infrared camera-module. It should be noted that the infrared lens unit 1 according to the present invention is used in an infrared camera capable of sensing infrared rays in mid-infrared and far-infrared regions, i.e. when the infrared lens unit 1 is not quick response to changes of the environment in the lens barrel, the quality of an image photographed might be made poor.

In FIG. 1, the infrared lens unit 1 illustrated is provided with a compensation shutter unit 2, a zooming lens 3, a focusing lens 4, and a vibration compensation (VC) mechanism 5. Then, the camera-module 50 is provided with an image sensor (image sensor) 51. The infrared lens unit 1 according to the present invention can control provided components of the lens unit 1 according to the lens data stored in the data memory.

Figure 2:
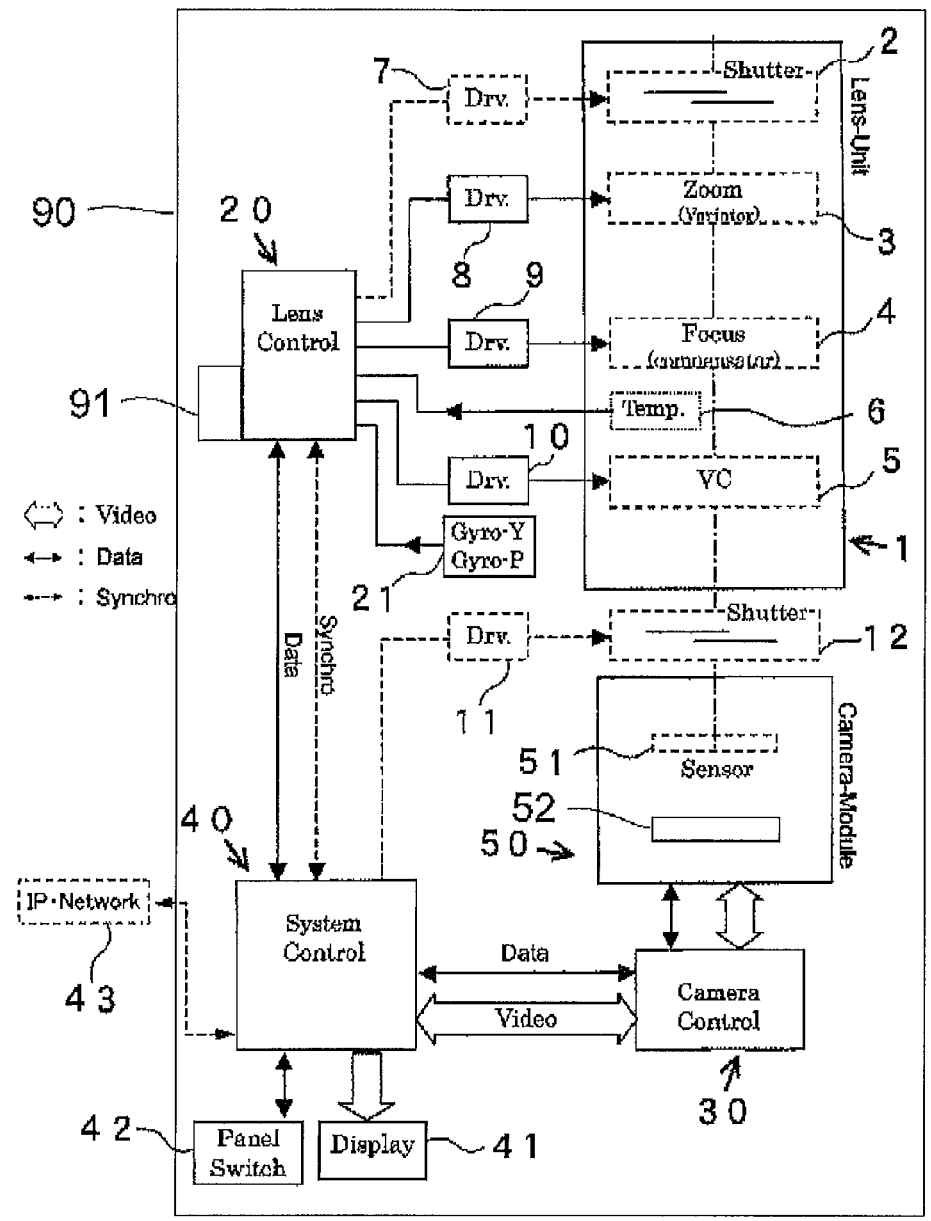
FIG. 2 is a diagram schematically illustrating a construction of an infrared camera system according to an embodiment of the present invention.

FIG. 2 is a diagram schematically illustrating a construction of an infrared camera system according to an embodiment of the present invention. FIG. 2 illustrates an infrared lens unit 1, a compensation shutter unit 2 provided in the infrared lens unit 1, a compensation shutter unit 12 provided in a camera-module 50, the zooming lens 3, the focusing lens 4, the vibration compensation (VC) mechanism 5, a temperature measurement mean (temperature detector) 6 which is provided inside and/or on the surface of a lens barrel of the infrared lens unit 1 to detects infrared energy inside and/or on the surface of the lens barrel of the infrared lens unit 1 and converts the infrared energy to a signal, a driver unit 7 for opening/closing mean of the compensation shutter unit 2, a driver unit 8 for positioning mean of the zooming lens 3, a driver unit 9 for positioning mean of the focusing lens 4, a driver unit 10 for driving mean of the VC mechanism 5, a driver 11 for opening/closing mean of the compensation shutter unit 12, a lens control mechanism 20, a gyro unit 21, a camera control mechanism 30 which converts a brightness signal output from the camera-module 50 to a video signal, a system control mechanism 40 for controlling the entire infrared camera system, a display 41 which displays a video image from a video signal output from the system control mechanism 40, a panel switch 42, an IP network 43, the camera-module 50 which generates and records image data after an emitted infrared rays are received at the image sensor, and the image sensor (image sensor) 51.

To the lens control mechanism 20, the temperature measurement unit 6 and the gyro unit 21 are connected and the drivers 7 to 10 and the system control mechanism 40 are also connected via the lens-side communication mechanism. With regard to the system control mechanism 40, the driver 11 for the compensation shutter unit 12 is connected and is connected to the camera control mechanism 30 to enable sending to and receiving from of data and video signals each other. The system control mechanism 40 enables sending to and receiving from of data and various signals with the IP network 43.

According to the matters above, the infrared lens unit 1 according to the present invention can directly drive the opening and closing mean of the compensation shutter unit 2, the positioning mean of the zooming lens 3, the positioning mean of the focusing lens 4, and the driving mean of the VC mechanism 5 by the lens control mechanism 20 according to the data detected by the temperature measurement unit 6 provided inside and/or on the surface of the infrared lens unit 1.

Furthermore, the lens control mechanism 20 of the infrared lens unit 1 according to the present invention sends a control signal for image focusing conditions in the infrared lens unit 1 to the components provided in the lens unit 1, namely the compensation shutter units 2 and 12, the zooming lens 3, the focusing lens 4, and the VC mechanism 5, through the lens-side communication mechanism according to lens data stored in the data memory.

The infrared camera-module 50 to which the infrared lens unit 1 according to the present invention is attached senses infrared rays from the compensation shutter units 2 and 12 simultaneously as well as infrared rays radiated from an object when an image of the infrared rays from the object is photographed. Therefore, reference temperature is obtained by detecting infrared rays from the surfaces of the compensation shutter units 2 and 12 via temporarily closing the compensation shutter units 2 and 12 at predetermined intervals (for example, with a given period of one second).

The infrared lens unit 1 according to the present invention stores an appropriate lens data table for independent data on the actual temperatures inside and/or on the surface of the infrared lens unit 1 detected by the temperature measurement unit 6 in the data memory (not shown) against to a reference temperatures obtained through the operation to obtain reference temperatures. The lens control mechanism 20 of the infrared lens unit 1 obtains the manipulated variable of the drivers according to the sensitivity compensation data through carrying out mathematical operations if required. Then lens control mechanism 20 can send a control signal for controlling components provided in the lens unit 1 to the system control mechanism 40 and the camera control mechanism 30 through the system control mechanism 40 by using the lens-side communication mechanism provided in the lens unit 1.

The infrared lens unit 1 according to the present invention is attachable to and detachable from the infrared camera-module 50. Communication of data signals between the lens control mechanism 20 in the lens unit 1 and the system control mechanism 40 in the infrared camera-module 50 may be enabled by electrically connecting mounts provided on both of the lens control mechanism 20 and the system control mechanism 40. With regard to the mounts, for example, when the bayonet hook is formed in the mounts, attach to and detach from of the lens unit 1 with the infrared camera-module 50 is made enable.

Thus, the lens control mechanism 20 sends a control signal for controlling an operation of the infrared camera-module 50 to the system control mechanism 40 in the infrared camera-module 50 through the lens-side communication mechanism according to the lens data (sensitivity compensation data) stored in the data memory in addition to the control signal described above. As a result, the system control mechanism 40 and the camera control mechanism 30 communicably connected can control image focusing operations of the infrared camera-module 50 based on the sensitivity compensation data.

As described above, the lens control mechanism 20 of the infrared lens unit 1 according to the present invention carries out mathematical operations if required according to the lens data after acquisition of a reference temperatures obtained through the operation to obtain reference temperatures and the actual temperatures inside and/or on the surface of the infrared lens unit 1 detected by the temperature measurement unit 6 and obtain the lens data (sensitivity compensation data) for independent data on the actual temperatures against to each reference temperatures via comparison with the table in the data memory (not shown). Then the lens unit 1 sends a control signal for controlling operations of the infrared camera-module 50 to the system control mechanism 40 in the infrared camera-module 50 through the lens-side communication mechanism provided in the lens unit 1. In this way, when the infrared lens unit 1 according to the present invention is used, appropriate operations in the operating components of the infrared camera-module 50 is performed by the system control mechanism 40 and the camera control mechanism 30 in the infrared camera-module 50 according to the control signal.

The lens data in the infrared lens unit 1 according to the present invention is preferably a data on a transmission ratio.

The infrared lens unit 1 according to the present invention is made able to obtain an accurate lens data responsive to a change in temperature (brightness) inside the lens barrel by that the lens data is the data on transmission ratio when the sensitivity compensation data is obtained. The matter utilizes the phenomenon in which a change in temperature (brightness) makes the transmission ratio of the lens change. It should be noted that all objects emit infrared rays according to their temperatures and emission ratio, but other emission may be reflected or transmitted. Among emission ratio, reflection ratio and transmission ratio, the equation "1=emission ratio+reflection ratio+transmission ratio" is established. Accordingly, temperature data can be obtained by dividing the amount of infrared radiation incident on the infrared lens unit 1 by emission ratio, subtracting reflected and transmitted radiation from the quotient, and converting the result to temperature. In addition, the degree of change in transmission ratio may be experimentally obtained by changing the actual temperature inside and/or on the surface of the infrared lens unit 1 for conditions under which measurements were made (images were taken) in advance at different reference temperatures, and the data obtained may be stored in the table in the data memory as a lens data (sensitivity compensation data) for individual conditions.

It should be noted that the infrared lens unit 1 according to the present invention may also apply any data other than data on transmission ratio as long as it enables acquisition of an accurate lens data responsive to changes in the temperature (brightness) in the lens barrel to be compensated as sensitivity compensation data. For example, a lens data that the infrared lens unit 1 according to the present invention receives may be for example, data on exit pupils, ambient light amount, or temperature in the lens barrel.

The lens data in the infrared lens unit 1 according to the present invention is preferably a data on heat radiated from the lens barrel and the optical system.

The infrared lens unit 1 according to the present invention is made enable to obtain an accurate lens data responsive to changes in temperature inside the lens barrel and a sufficient image compensation effect in compensation of the photographed image when the lens data is a data on heat radiated from the lens barrel and the optical system. As a result, when the infrared lens unit according to the present invention is used, the accuracy in both determination of movement of the position and identification of the object can be improved.

Furthermore, the lens data in the infrared lens unit 1 according to the present invention is preferably a data on focal length.

The infrared lens unit 1 according to the present invention is made enable to define precise positions of the zooming lens 3 and the focusing lens 4 and accurate control actions when the lens data is data on focal length in acquisition of sensitivity compensation data. It should be noted that the infrared lens unit 1 according to the present invention may also apply any data other than data on focal length as long as it enables acquisition of an accurate lens data responsive to the positions of lenses in the lens barrel to be compensated as sensitivity compensation data. For example, a lens data that the infrared lens unit 1 according to the present invention receives may be data such as data on the f number of a lens or the amount of drive of a lens. Moreover, the infrared lens unit 1 according to the present invention can use data on a contrast evaluation value, the number of detector pixels, and the response of a detector, for example, in order to perform a more accurate autofocusing operation.

Furthermore, the infrared lens unit 1 according to the present invention preferably comprises a temperature measurement unit (temperature detector) 6 which detects the temperature inside and/or on the surface of the lens barrel and the lens-side communication mechanism which sends detected temperature data to the infrared camera-module 50 together with the lens data to control an image focusing operation of the infrared camera-module 50.

In the infrared lens unit 1 according to the present invention, because the infrared lens unit 1 is provided with the temperature measurement unit (temperature detector) which detects the temperature inside and/or on the surface of the lens barrel and lens-side communication mechanism which sends detected temperature data to the infrared camera-module together with the lens data, an environment when sensitivity compensation data is compensated and an environment when an image is taken more can be made close to each other. As a result, when the infrared lens unit according to the present invention is used, the accuracy of the image focusing operation control of the infrared camera-module improve and operations of the passive components from the infrared camera-module are made more appropriately controlled.

Furthermore, in the infrared lens unit 1 according to the present invention, a detected temperature data is preferably one of a parameter of each function that compensate an effect of the transmission ratio of the lens, the heat radiated from a lens barrel and an optical system, and the focal length of the lens on an image photographed.

In the infrared lens unit 1 according to the present invention, because the detected temperature data is made one of the parameters of functions described above that compensate the effect on an image photographed, image focusing operations of the infrared camera-module can be automatically controlled and improvement and stabilization in accuracy of the lens data can be achieved.

Furthermore, in the infrared lens unit 1 according to the present invention, the detected temperature data is more preferably a gap-compensation temperature data obtained by compensating a temperature difference between the temperature inside the lens barrel and the temperature on the surface of the lens barrel detected by the temperature detector 6 and the temperature of an imaging lens of the infrared lens unit at the time controlling an image focusing operation of the infrared camera-module.

The temperature of the imaging lenses cannot be detected by providing the temperature measurement unit 6 in an effective region of each imaging lens of the infrared lens unit, for example each of the zooming lens 3, the focusing lens 4, and the lenses included in the VC mechanism 5. Therefore, data on the temperature inside and/or on the surface of the lens barrel detected by the temperature measurement unit 6 differs from the temperature of an imaging lens in the infrared lens unit which is provided at the location physically remote from the location where the temperature measurement unit 6 is provided.

The temperature difference is caused when a temperature change in the environment where the infrared camera is used and/or a change in the heat generation in the infrared camera itself due to the temperature difference between temperature data detected by the temperature measurement unit 6 and the actual temperature inside the lens barrel or an optical component of the infrared lens unit 1 in the time.

Therefore, gap-compensation temperature data obtained by compensating a temperature difference between the temperature inside and/or on the surface of the lens barrel at the time of the operation detecting temperature by the temperature measurement unit 6 and the temperature of an imaging lens in the infrared lens unit 1 at the time of controlling an image focusing operation of the infrared lens unit 1 may be used as detected temperature data.

One example of a method for calculating gap-compensation temperature data will be described below. The relationship between the temperature Ts inside and/or on the surface of the lens barrel detected by the temperature measurement unit 6 at each temperature measurement intervals is and an estimated temperature Te of an imaging lens in the infrared lens unit 1 can be calculated for each measurement interval tes by the following equation.

$$Te = Te1 + kt(Ts - Te1) \quad \text{(Equation)}$$

Here, kt is a coefficient representing a heat transfer characteristic and it makes approximation of a heat transfer lag enable together with the measurement interval ts. Te1 is an estimated temperature value calculated at the latest sampling. The coefficient of heat transfer kt and the measurement interval ts used here are preferably determined by experiment conducted in advance.

Data on the coefficient of heat transfer kt and the measurement interval ts are stored in the data memory of the infrared lens unit 1 in advance as a data used for calculation of gap-compensation temperature data. Then, the infrared lens unit 1 calculates an estimated temperature Te of an imaging lens of the infrared lens unit 1 according to the data on the actual temperature inside and/or on the surface of the infrared lens unit 1 measured by the temperature measurement unit 6, and the estimated temperature Te of the imaging lens is sent to the infrared camera-module 50 as gap-compensation temperature data.

In this way, by appropriately compensating a temperature difference between the temperature inside and/or on the surface of the lens barrel detected by the temperature measurement unit 6 and the temperature of the lens unit at the time of controlling an image focusing operation in the infrared camera-module, the approximate temperature of the imaging lens of the infrared lens unit 1 can be sent to the infrared camera-module 50 to be controlled as a gap-compensation temperature. Therefore, the system control mechanism 40 of the infrared camera-module 50 is made control of the components in the camera-module 50 possible according to the temperature closer to the actual temperature of the imaging lens of the infrared lens unit 1. Thus, the temperature of the imaging lens of an infrared lens unit in which a temperature measurement unit cannot be provided can be appropriately estimated to control the infrared camera even if a lens supporting mechanism is made of a material with low efficiency in heat transfer.

In the descriptions, estimated temperature Te of the imaging lens is calculated by the lens control mechanism 20 of the lens unit 1 and is sent to the system control mechanism 40 as gap-compensation temperature data, but the present invention is not limited to the manner. Data on the coefficient of heat transfer kt and the measurement interval is may be stored in the memory of the system control mechanism 40 and the system control mechanism 40 may directly calculate an estimated temperature Te of the imaging lens. In this case, the estimated temperature Te of the imaging lens calculated in the system control mechanism 40 may be different from an estimated temperature Te of the imaging lens calculated in the lens control mechanism 20 due to a factor such as a change of positions of the lenses caused by a temperature change of the imaging lens and a change in the amount of heat radiated from components, including the lens barrel, on which the temperature measurement unit 6 is provided. Therefore, it is preferable that estimated temperatures Te be calculated in both of the system control mechanism 40 and the lens control mechanism 20.

Furthermore, the calculations may be performed at the measurement intervals ts as described above or may be performed at intervals different from actual measurement intervals. Moreover, the temperature Ts inside and/or on the surface of the lens barrel used for the calculation may be a temperature obtained in every calculation interval or may be the average of values measured previously at multiple intervals.

Next, the infrared lens unit 1 according to the present invention can be contained in a housing 90 in the state where the infrared camera-module 50 is attached to. The housing 90 can prevent dust from getting into the lens unit 1 and/or the camera-module 50 when the infrared camera system composed of the infrared lens unit 1 and the infrared camera-module 50 is used in the environments outdoor or the like.

The infrared lens unit 1 includes a housing detector (furnished housing detecting mechanism) 91 which detects whether or not the infrared lens unit 1 attached to the camera-module 50 is contained in the housing 90, that is, whether or not the housing 90 is furnished.

When the housing 90 is furnished to the infrared camera system, the temperatures of the surroundings of the components such as lenses may not change rapidly, but when the housing 90 is not furnished, the infrared camera system may be easily affected by the external environment changes.

Therefore, when the housing detector 91 detects that the housing 90 is furnished, the lens control mechanism 20 sets the coefficient of heat transfer kt in the equation for the gap-compensation temperature data described above according to the detection to a value close to 1 to directly reflect the temperature Ts inside and/or on the surface of the lens barrel detected by the temperature measurement unit 6. In this case, a normal measurement interval is applied as the temperature measurement interval ts. The manner can reduce a temperature difference when temperature difference is converging.

On the other hand, when the housing detector 91 detects that the housing 90 is not furnished, the lens control mechanism 20 sets, according to the detection, the coefficient of heat transfer kt in the equation of gap-compensation temperature data described above is made to be a value that makes a temperature difference at the time of temperature varying smaller than a temperature difference when the temperature difference is converging. That is, the coefficient of heat transfer kt is set to a value smaller than that when the housing is furnished. The temperature measurement interval ts in this case is set to a value smaller than the normal interval. If the infrared camera system is portable and is transported from a room to the outside and used, the settings minimize a temperature difference when the infrared camera system is transferred from one environment to another environment at a significantly different temperature.

It should be noted that while whether the housing 90 is furnished or not is detected by the housing detector 91 in this embodiment, the method of detecting the housing 90 is not limited to the manner. A dipswitch or the like may be provided to input whether the housing 90 is furnished or not.

The infrared camera-module 50 to be attached to the infrared lens unit 1 according to the present invention includes a heater (heating mechanism) 52 for maintaining a temperatures of the lens unit 1 and the camera-module 50 at a certain temperature range. Electric conduction of the heater 52 is controlled according to temperatures measured by the temperature measurement unit 6 which detects the temperature inside and/or on the surface of the lens barrel of the infrared lens unit 1. That is, when the measured temperature reaches a predetermined lower limit, the heater 52 is switched on for heating and when the measured temperature reaches a predetermined upper limit, which is higher than the lower limit by a predetermined temperature, the heater 52 is switched off to stop heating. Note that, control of electric switching of the heater 52 is not limited to this manner; electric switching of the heater 52 may be controlled by turning on and off a heater switch properly.

In the heating state when the heater 52 is turned on, a temperature distribution different from the state without using the heater 52, i.e. different from the state when the heat affects just through atmosphere may appear. Therefore, when heated by the heater 52, the lens control mechanism 20 adopts an appropriate coefficient of heat transfer kth and temperature measurement interval tsh to heating states, which are obtained by experiment performed under the heating states, in place of the coefficient of heat transfer kt and the temperature measurement period is in the equation of the gap-compensation temperature data described above. In this way, gap-compensation temperature data can be changed in response to a temperature difference under heating by the heater 52. Accordingly, the system control mechanism 40 of the infrared camera-module 50 can control the components in the camera-module 50 according to a temperature close to the temperature of the imaging lens of the infrared lens unit 1 to be controlled even during heating.

Furthermore, the lens data in the infrared lens unit 1 according to the present invention is preferably a data in a vibration compensation mechanism which optically compensates a fluctuation of a photographed image.

In the infrared lens unit 1 according to the present invention, a photographed image excellent in definition can be obtained because the received lens data is a data on the amount of image movement in a vibration compensation mechanism which optically compensates a fluctuation of a photographed image and the data makes grasp of position of the vibration compensation mechanism (the position of a compensation lens) accurate. A VC (vibration compensation) method disclosed in Japanese Patent Laid-Open No. 2004-362924 entitled "Actuator and Lens Unit and Camera Provided with the Actuator", previously filed by the present applicant may be used as the vibration compensation mechanism. The infrared lens unit 1 according to the present invention can also use any data other than the data on the amount of image movement in the vibration compensation mechanism as long as it enables acquisition of the accurate lens data against to position of the vibration compensation mechanism in the lens barrel. For example, the data that the infrared lens unit 1 according to the present invention receives may be data on on/off of the vibration compensation mechanism, response characteristics, and timing of pixel interpolation or the like.

In this case when the infrared lens unit 1 is contained in the housing 90, the infrared lens unit 1 is used in a stationary mode. In contrast, when the housing 90 is removed, the infrared lens unit 1 is used in a mobile mode, i.e. service conditions are different. Therefore, in the infrared lens unit 1 according to the present invention, the data on the amount of image movement by the vibration compensation mechanism of the camera-module 50 should be obtained by experiment independently for with and without furnishing of the housing 90 in advance and are stored in the data memory of the infrared lens unit 1.

When the housing detector 91 detects that the housing 90 is furnished, the lens control mechanism 20 optically compensates fluctuations of a photographed image with the VC mechanism according to data on the amount of image movement when the housing 90 is furnished. On the other hand, when the housing detector 91 detects that the housing 90 is removed, the lens control mechanism 20 optically compensates fluctuations of a photographed image with the VC mechanism according to the amount of image movement when the housing 90 is not furnished. Consequently, the position of the VC mechanism (the position of a compensation lens) can be accurately identified and a photographed image excellent in definition responsive to situations can be provided.

As has been described above, data signals stored and sent by the infrared lens unit 1 according to the present invention include data on temperature (brightness) measurements, data on the positions of the zooming lens 3 and the focusing lens 4, data on auto-focusing operations, and data on the position of the mechanism that optically compensates fluctuations of a photographed image. Note that these data are pointed out as latest factors required for maintaining high quality in photographed image of the infrared camera. So, lens data that the infrared lens unit 1 according to the present invention compensates is not limited to these data.

The infrared lens unit 1 according to the present invention is preferably an interchangeable lens unit that is attachable to and detachable from the infrared camera-module.

When the infrared lens unit 1 according to the present invention is an interchangeable lens unit attachable to and detachable from an infrared camera-module, it is compatible with conventional infrared cameras. Thus, a high quality infrared camera can be provided just exchanging to the infrared lens unit 1

Figure 3:
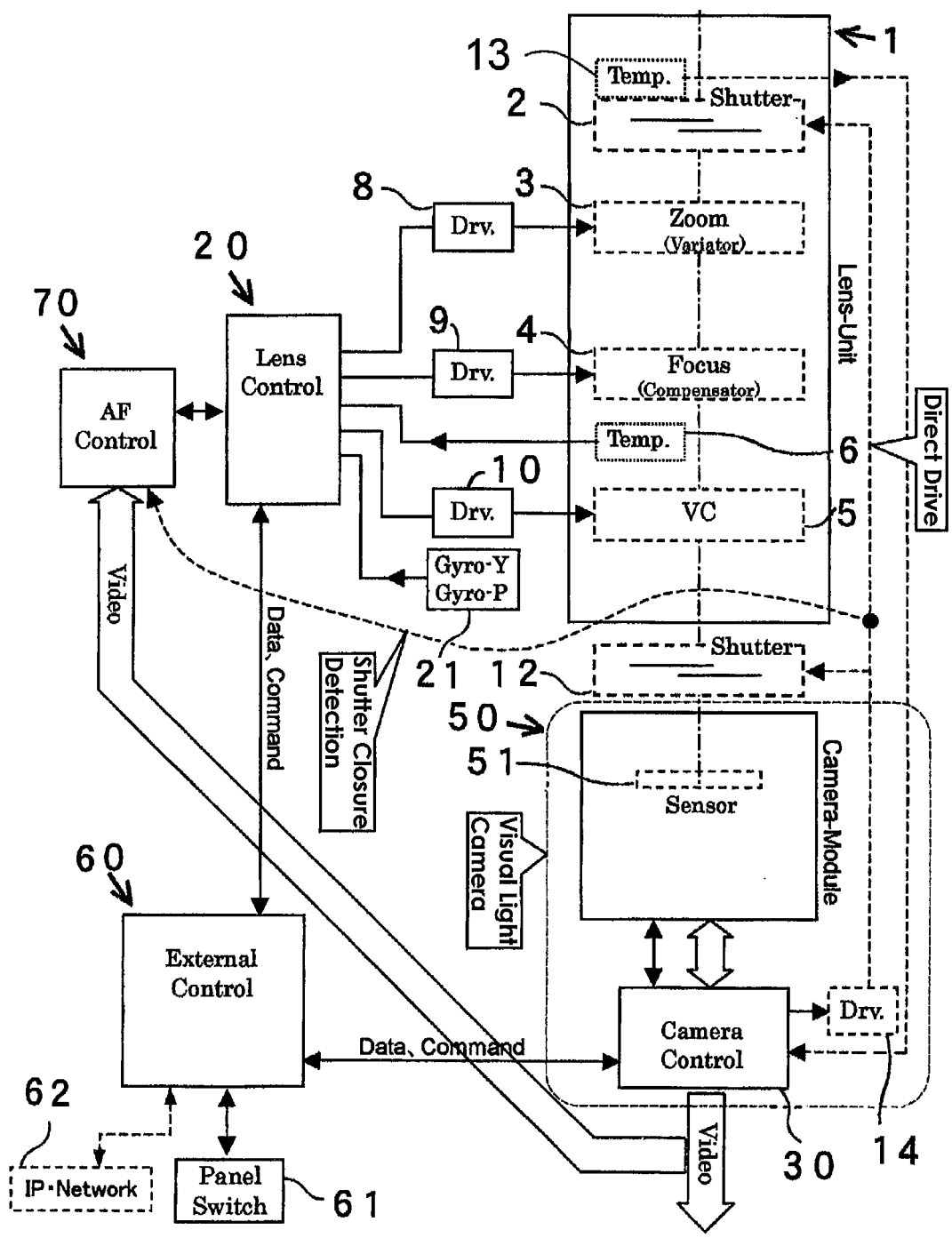
FIG. 3 is a diagram schematically illustrating an infrared camera system according to another embodiment of the present invention.

FIG. 3 is a diagram schematically illustrating a construction of an infrared camera system according to another embodiment of the present invention. FIG. 3 illustrates a camera system in which a lens unit 1 according to the present invention is attached to a conventional infrared camera. FIG. 3 shows an infrared lens unit 1, a compensation shutter unit 2 provided in the infrared lens unit 1, a compensation shutter unit 12 provided in a camera-module 50, a zooming lens 3, a focusing lens 4, a vibration compensation (VC) mechanism 5, temperature measurement units (temperature detectors) 6 and 13 which are provided inside and/or on the surface of a lens barrel of the infrared lens unit 1 to detect infrared energy in different locations inside and/or on the surface of the lens barrel of the infrared lens unit 1 and convert the infrared energy to a signal, a driver 8 for the zooming lens 3, a driver 9 for the focusing lens 4, a driver 10 for the VC mechanism 5, a driver 14 for the compensation shutter units 2 and 12, a lens control mechanism 20, a gyro unit 21, a camera control mechanism 30 which converts a brightness signal output from the camera-module 50 to a video signal, the camera-module 50 which generates and records image data after an emitted infrared rays is received at an image sensor, an image sensor (image sensor) 51, an external control mechanism 60 for controlling the entire infrared camera system, a panel switch 61, an IP network 62, and an autofocus control mechanism 70.

The temperature measurement unit 6 and the gyro unit 21 are connected to the lens control mechanism 20 and the drivers 8 to 10 are also connected to the lens control mechanism 20 through lens-side communication mechanism. The camera control mechanism 30 is connected to the driver 14 for the compensation shutter units 2 and 12 and also connected to the external control mechanism 60 to send and receive data and various signals to and from the external control mechanism 60. The camera control mechanism 30 is connected to the autofocus control mechanism 70 and can send and receive video signals to and from the autofocus control mechanism 70. The external control mechanism 60 can send and receive data and various signals to and from the IP network 62.

As illustrated in FIG. 3, the infrared lens unit 1 according to the present invention can directly and individually drive the zooming lens 3, the focusing lens 4, and the VC mechanism 5 by mean of the lens control mechanism 20 according to numerical data measured by the temperature measurement units 6 and 13 provided in the infrared lens unit 1

The infrared lens unit 1 according to the present invention will be described below in further detail.

[How to Store Lens Data in Infrared Lens Unit]

For example, two 16-megabyte memories can be provided in the infrared lens unit 1 according to the present invention to enable reading and/or writing of the information for programs. Furthermore, two 128-megabyte memories can be provided in the infrared lens unit 1 for temporarily storing data on parameters for improving high quality in photographed image. In the case in which an infrared thermal image is temporarily stored in the infrared lens unit 1, settings can be made so that 8-bits, 256-level image data is stored, for example. The number of bits can be increased to 16 or 32, for example, in order to improve image definition. Note that the method for storing lens data in the infrared lens unit 1 according to the present invention described above is just example.

So, any other method may be used for storing lens data as required by the design of the infrared lens unit 1.

[Communication Method in Infrared Lens Unit]

Figure 5:
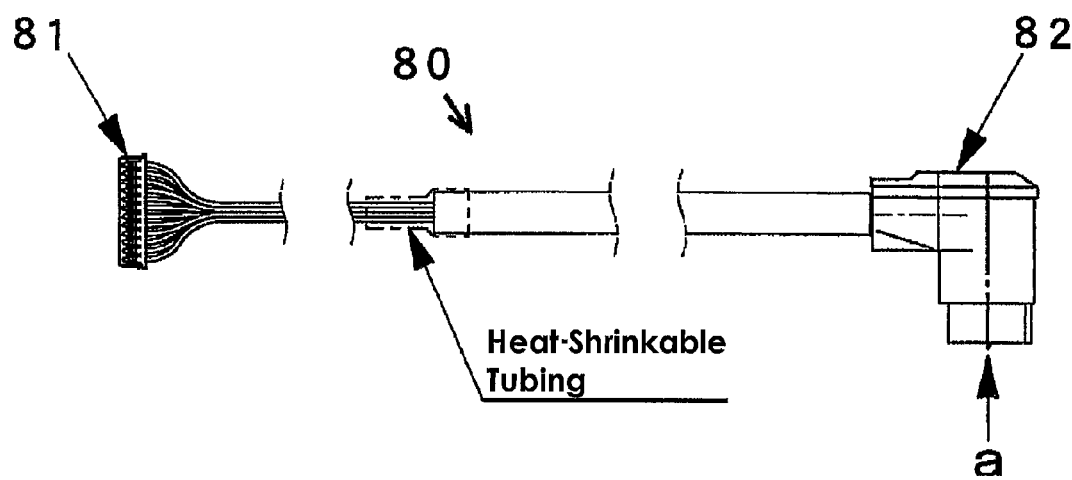
FIG. 5A is a diagram illustrating a cable used in an infrared camera system according to the present invention.
FIG. 5B is a diagram illustrating a shape and arrangement of pints of a connector viewed in the direction of arrow A in FIG. 5A.
Figure 5:
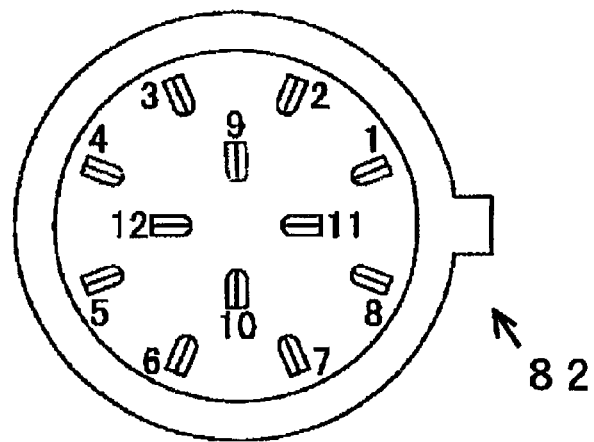

A cable that includes three serial lines for communication with three signals, a data output signal, a data input signal and a clock signal, can be used for data communication in the infrared lens unit 1 according to the present invention and for sending and receiving data to and from an infrared camera-module-side. FIG. 5 exemplifies a cable used by the infrared lens unit 1 for data communication. The cable 80 in FIG. 5 is provided two connectors 81 and 82 at the both ends. Table 1 shows an arrangement and functions of the pins of the cable connector 82 illustrated in FIG. 5. The cable shown in FIG. 5 with Table 1 makes image quality of an infrared camera high by performing data communication because handling is easy and has a low-noise structure and it.

TABLE 1

| Pin No. | Designation | Function |
|---|---|---|
| 1 | SCK | Clock for SPI communication |
| 2 | SI | Input of lens unit data for SPI communication |
| 3 | SO | Output of lens unit data for SPI communication |
| 4 | EN | Enable signal for SPI communication (lens unit select signal) |
| 5 | INT | Interrupt input (vertical synchronization signal) |
| 6 | DGND | Signal GND |
| 7 | NC | No connection |
| 8 | NC | No connection |
| 9 | +3.3 V | Logic system power input: +3.3 V |
| 10 | DGND | Logic system power GND |
| 11 | +5.0 V | Motor driving power input: +5.0 V |
| 12 | PGND | Motor driving power GND |

[Processing Procedure in Infrared Lens Unit]

Figure 4:
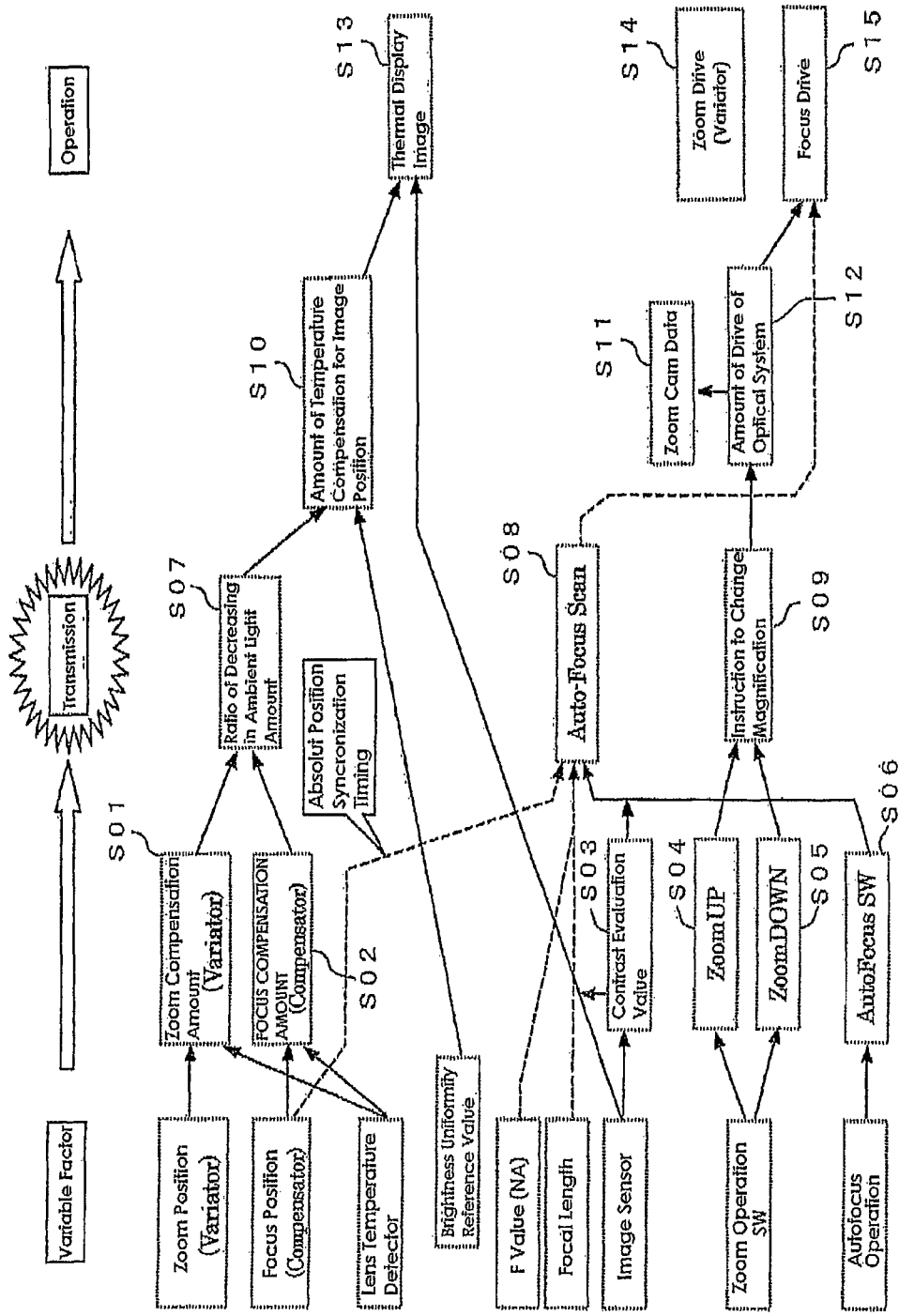
FIG. 4 is a flowchart illustrating a process performed in an infrared lens unit according to an embodiment of the present invention.

FIG. 4 is a diagram illustrating a processing procedure in an infrared lens unit according to an embodiment of the present invention. The relationship of data transmitted and control actions to variable factors of the lens unit according to the present invention will be described below. It should be noted that lens data (sensitivity compensation data) related to data on the temperatures inside and/or on the lens barrel of the infrared lens unit 1 associated with individual reference temperatures obtained by experiment is stored in a data memory of the infrared lens unit 1 in advance.

With regard to zoom position variations, the amount of zooming lens compensation is calculated first as data to be transmitted (step S01). Then, based on the data transmitted from step S01, the ratio of decreasing in ambient light amount is calculated (step S07). Next, based on the data transmitted from step S07, the amount of temperature compensation relating to the position of an image is calculated (step S10). Then, a thermal display image is generated as a control action (step S13).

With regard to focus position variations, the first option is that the amount of the focusing lens compensation is calculated first as the data to be transmitted (step S02). Then, based on the data transmitted from step S02, ration of decreasing in ambient light amount is calculated (step S07). Next, based on the data transmitted from step S07, the amount of temperature compensation related to the position of an image is calculated (step S10). Then, a thermal display image is generated as a control action (step S13). The second option is that autofocus scanning is performed first for the data to be transmitted (step S08). Then, the focusing lens is driven as a control action (step S15). It should be noted that when the autofocus scanning is performed, the absolute position of the focusing lens and correct synchronization timing can be detected.

With regard to variations in the lens temperature detector, the amount of zooming lens or focusing lens compensation is calculated first as the data to be transmitted (step S01 or S02). Then, based on the data transmitted from step S01 or S02, the ratio of decreasing in ambient light amount is calculated (step S07). Next, based on the data transmitted from step S07, the amount of temperature compensation related to the position of an image is calculated (step S10). Then, a thermal display image is generated as a control action (step S13).

With regard to variations in a brightness uniformity reference value, temperature compensation is first performed for the position of an image as the data to be transmitted (step S10). Then, a thermal display image is generated as a control action (step S13).

With regard to f-number (NA) variations, autofocus scanning is performed first to obtain the data to be transmitted (step S08). Then, the focusing lens is driven as a control action (step S15).

With regard to focal length variations, autofocus scanning is performed first to obtain the data to be transmitted as in the case of f-number (NA) variations (step S08). Then, the focusing lens is driven as a control action (step S15).

With regard to image pickup detector variations, a contrast evaluation value is first detected as the data to be transmitted (step S03). Then, based on the data transmitted from step S03, autofocus scanning is performed (step S08). Next, the focusing lens is driven as a control action (step S15). Further, with regard to variations in the image pickup detector, a thermal display image can be directly generated as a control action (step S13). Furthermore, the thermal display image may also be generated (step S13) according to contrast evaluation value data detected (step S03).

With regard to variations in a zoom operation switch, a zoom-up operation (step S04) or a zoom-down operation (S05) is first checked as the data to be transmitted. Then, based on the data transmitted from step S04 or S05, an instruction to change magnification is issued (step S09). Next, based on the data transmitted from step S09, the amount of drive of the optical system is calculated (step S12). Then, driving of the zooming lens (S14) or driving of the focusing lens (S15) is performed as a control action. Note that in the step of calculating the amount of drive of the optical system (step S12), zoom cam data relating to the positional relationship between the zooming lens and the focusing lens can be exchanged (step S11).

With regard to variations in auto-focusing operation, whether an autofocus switch is turned on or not is checked first as the data to be transmitted (step S06). Then, based on the data transmitted from step S06, autofocus scanning is performed (step S08). Next, the focusing lens is driven as a control action (step S15).

A process performed in the infrared lens unit according to an embodiment of the present invention has been described. However, the process described above is just example of the present invention and does not limit the present invention. Various modified designs are applicable as required by specific applications without departing from the concept of the present invention.

Infrared Camera System According to the Present Invention

An infrared camera system (not illustrated) according to the present invention is characterized by using an infrared lens unit 1 according to the present invention described above. Thus, an infrared camera provided with an infrared camera system of the present invention is the infrared camera excellent in an optical quality.

INDUSTRIAL APPLICABILITY

As has been described above, when an infrared lens unit according to the present invention is used, an infrared camera system with a high optical quality can be provided. Furthermore, when the infrared lens unit according to the present invention is used in a system such as a surveillance camera or the like that should continue image photographing of the objects the infrared lens unit can reduce interruption of infrared image photographing of the objects. Thus, an infrared camera system using the infrared lens unit according to the present invention can accurately recognize the objects even in the dark. So, the infrared lens unit can be advantageously used in an infrared camera system for automobile, a surveillance camera for security or the like.

The invention claimed is:

1. An infrared lens unit to be attached to an infrared camera-module, wherein the infrared lens unit comprises:
   a data memory for storing a lens data;
   a temperature detector detecting a temperature in a lens barrel and/or a temperature at a surface of the lens barrel; and
   a lens control mechanism which controls at least one component installed in the infrared lens unit according to the lens data stored in the data memory and controls an image focusing condition;
   a housing which is made containing of the infrared camera-module and the infrared lens unit; and
   a furnished housing detecting mechanism for detecting whether or not the infrared lens unit is furnished with the housing;
   wherein a gap-compensation temperature data is changed according to detection of the housing furnished;
   wherein the gap-compensation temperature data is obtained by compensating a difference between the temperature inside and/or on the surface of the lens barrel detected by the temperature detector and a temperature of an imaging lens of the infrared lens unit at a time controlling an image focusing operation of the infrared camera-module.

2. The infrared lens unit according to claim 1, wherein the lens data is a data on a heat radiated from a lens barrel and an optical system.

3. The infrared lens unit according to claim 1, wherein the lens data is a data on a focal length.

4. The infrared lens unit according to claim 1, wherein the lens data is a data on a transmission ratio.

5. The infrared lens unit according to claim 4, wherein a lens-side communication mechanism sends a detected temperature data to the infrared camera-module together with the lens data to control an image focusing operation of the infrared camera-module.

6. The infrared lens unit according to claim 5, wherein the temperature data is one of a parameter of each function that compensate an effect of the transmission ratio of a lens, a heat radiated from a lens barrel and an optical system, and a focal length of the lens on an image photographed.

7. The infrared lens unit according to claim 1, wherein the infrared camera-module is provided with a heating mechanism and the gap-compensation temperature data is changed during heating of the infrared camera-module by the heating mechanism.

8. The infrared lens unit according to claim 1, further comprising a lens-side communication mechanism for sending a control signal on an image focusing condition in an infrared lens unit side.

9. The infrared lens unit according to claim 1, further comprising a lens-side communication mechanism for sending a control signal for controlling an operation of the infrared camera-module to the infrared camera-module to control an image focusing operation of the infrared camera-module according to the lens data stored in the data memory.

10. The infrared lens unit according to claim 1, an interchangeable type attachable to and detachable from the infrared camera-module.

11. An infrared camera system comprising the infrared lens unit according to claim 1.

12. An infrared lens unit to be attached to an infrared camera-module, wherein the infrared lens unit comprises:
   a data memory for storing a lens data;
   a temperature detector detecting a temperature in a lens barrel and/or a temperature at a surface of the lens barrel; and
   a lens control mechanism which controls at least one component installed in the infrared lens unit according to the lens data stored in the data memory and controls an image focusing condition;
   wherein the lens data comprises a data on an amount of image movement in a vibration compensation mechanism which optically compensates a fluctuation of a photographed image;
   a housing which is made containing of the infrared camera-module and the infrared lens unit; and
   a furnished housing detecting mechanism for detecting whether or not the infrared lens unit is furnished with the housing;
   wherein the data on the amount of image movement in the vibration compensation mechanism is changed according to detection of the housing furnished.

13. The infrared lens unit according to claim 12, an interchangeable type attachable to and detachable from the infrared camera-module.

* * * * *